United States Patent [19]

Bailly et al.

[11] Patent Number: 5,731,389
[45] Date of Patent: Mar. 24, 1998

[54] BLENDS OF POLYESTERS AND POLYESTERAMIDES, OPTIONALLY WITH POLYCARBONATES

[75] Inventors: Christian Maria Emile Bailly, Antwerp, Belgium; Bret Chisholm, Mt. Vernon, Ind.; Rene de Jongh, Bergen op Zoom; Gerrit de Wit, Ossendrecht, both of Netherlands

[73] Assignee: General Electric Company, Pittsfield, Mass.

[21] Appl. No.: 637,056

[22] Filed: Apr. 24, 1996

[51] Int. Cl.$^6$ .................... C08F 20/00; C08G 69/26
[52] U.S. Cl. .................... 525/437; 528/272; 528/288; 528/308; 528/308.6; 528/335; 525/439; 525/461; 525/540; 524/81
[58] Field of Search .................... 528/272, 288, 528/308, 308.6, 335; 525/437, 439, 461, 540; 524/81

[56] References Cited

U.S. PATENT DOCUMENTS

| | | |
|---|---|---|
| 2,856,385 | 10/1958 | Van Den Berghe et al. |
| 3,849,514 | 11/1974 | Gray, Jr. et al. |
| 4,081,428 | 3/1978 | Thompson. |
| 4,116,943 | 9/1978 | Ducarre. |
| 4,129,715 | 12/1978 | Chen et al. |
| 4,145,372 | 3/1979 | Murray et al. |
| 4,209,607 | 6/1980 | Shalaby et al. |
| 4,315,086 | 2/1982 | Ueno et al. |
| 4,386,174 | 5/1983 | Cogswell et al. |
| 4,501,879 | 2/1985 | Barbee et al. |
| 4,579,914 | 4/1986 | Nelb, II et al. |
| 4,614,815 | 9/1986 | Cognigni et al. |
| 4,649,180 | 3/1987 | Chen et al. |
| 4,664,972 | 5/1987 | Connolly. |
| 4,732,937 | 3/1988 | Sybert. |
| 4,732,938 | 3/1988 | Grant et al. |
| 4,845,160 | 7/1989 | Sybert. |
| 4,868,277 | 9/1989 | Chen. |
| 4,873,286 | 10/1989 | Gallucci et al. |
| 4,952,629 | 8/1990 | Liang. |
| 4,994,531 | 2/1991 | Brown. |
| 5,010,144 | 4/1991 | Phanstiel, IV et al. |
| 5,028,649 | 7/1991 | Efner. |
| 5,089,566 | 2/1992 | Brown et al. |
| 5,089,567 | 2/1992 | Phanstiel et al. |
| 5,091,494 | 2/1992 | Leistner et al. |
| 5,096,979 | 3/1992 | Brown et al. |
| 5,110,896 | 5/1992 | Waggoner et al. |
| 5,132,361 | 7/1992 | Shea et al. |
| 5,132,373 | 7/1992 | Khouri et al. |
| 5,153,267 | 10/1992 | Brown et al. |
| 5,153,290 | 10/1992 | Khouri et al. |
| 5,210,191 | 5/1993 | Phanstiel et al. |
| 5,212,255 | 5/1993 | Khouri et al. |
| 5,214,099 | 5/1993 | Khouri et al. |
| 5,247,006 | 9/1993 | Khouri et al. |
| 5,321,099 | 6/1994 | Goldwasser et al. |

FOREIGN PATENT DOCUMENTS

| | | |
|---|---|---|
| 0 058 938 A1 | 9/1982 | European Pat. Off. |
| A2 0 143 953 | 6/1985 | European Pat. Off. |
| 0 271 914 A2 | 6/1988 | European Pat. Off. |
| 0 315 027 A2 | 10/1989 | European Pat. Off. |
| 0438128 A2 | 1/1991 | European Pat. Off. |
| 0 437 981 A1 | 7/1991 | European Pat. Off. |
| 0 445 548 B1 | 11/1991 | European Pat. Off. |
| 0 457 564 A1 | 11/1991 | European Pat. Off. |
| 0 608 976 A1 | 8/1994 | European Pat. Off. |
| 2 299 357 | 8/1976 | France. |
| 271 823 A3 | 8/1989 | German Dem. Rep. |
| 56-103221 | 8/1981 | Japan. |
| 56-147842 | 11/1981 | Japan. |
| 57-137321 | 8/1982 | Japan. |
| 57-207643 | 12/1982 | Japan. |
| 57-207644 | 12/1982 | Japan. |
| 57-209954 | 12/1982 | Japan. |
| 60-229919 | 11/1985 | Japan. |
| 61-081453 | 4/1986 | Japan. |
| 3255124 | 11/1991 | Japan. |
| 4202461 | 7/1992 | Japan. |
| 4202462 | 7/1992 | Japan. |
| 5086267 | 4/1993 | Japan. |
| 5117505 | 5/1993 | Japan. |
| 6041400 | 2/1994 | Japan. |
| 1365952 | 9/1974 | United Kingdom. |
| 2 012 288 | 7/1979 | United Kingdom. |

OTHER PUBLICATIONS

Chemical Abstract—AN 121:110510 CA.
Gaymans, R.J., DeHaan J.L., Van Niewenhuize, O., J.Pol.Sci.Chem. 31 575 (1993).
Williams, J.L.R., Laakso T.M., contois L.E., J.Pol.Sci. 61 353 (1962).
Della Fortuna G., Oberrauch E., Salvatori T., Sorta E., Bruzzone M., Polymer 18 269 (1977).
Delimoy D., Bailly C., Deveaux J., Legras R., Pol.Eng.Sci.& Eng. 28 104 (1988).
Aharoni S.M., Macromolecules 21 1941 (1988).
Yamazaki N., Masumotom., Higashi F., J.Polym.Sci., Polym.Chem.Ed 13 1373 (1975).
De Candia F., Maglio G., Palumbo R., Polym.Bull. 8 109 (1982).
Yamada K., Hashimoto K., Takayanagi M., Murata Y., J.Appl.Polym.Sci. 33 1649 (1987).
Manzini, G., Crescenzi, V., Ciana, A., Ciceri, L., Fortuna, G. Della, and Zotteri, L. European Polymer Journal, 1973, vol. 9, pp. 941–951.

*Primary Examiner*—Samuel A. Acquah

[57] ABSTRACT

Disclosed are blends of polyesteramides and polyester resins, optionally with polycarbonates, as well as methods for preparing said blends thereof. Preferred polyesteramides are those comprising amide units of formula (I):

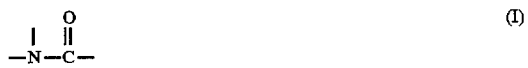

and ester units of formula (II):

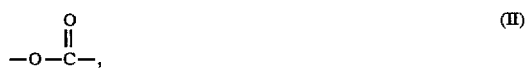

wherein the ratio of (I) to (II) is at least 1:1, and more preferably wherein at least 80% of the units of formula (I) are separated by at least one of the units of formula (II).

9 Claims, No Drawings

BLENDS OF POLYESTERS AND POLYESTERAMIDES, OPTIONALLY WITH POLYCARBONATES

FIELD OF THE INVENTION

The present invention relates to blends of polyesteramide copolymers and polyester resins, optionally with polycarbonate resins. The present invention further comprises blends of polyesteramides and polyester resins, optionally with polycarbonate resins, and wherein the polyesteramide copolymer has a specific uniform structure. The present invention also comprises methods for making blends of polyesteramide copolymers and polyester resins, optionally with polycarbonate resins, as well as useful articles of manufacture molded therefrom.

BACKGROUND OF THE INVENTION

EP-A-0 315 027 describes copolymers of the general formula:

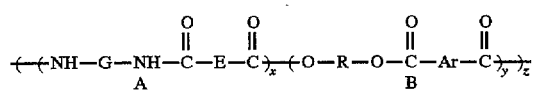

In this formula x, y and z are each integers from 1 to 100,000. G may be the residue of tetramethylenediamine, E may be the residue of terephthalic acid, R may be the residue of 1,4-butanediol, Ar is a divalent aromatic carboxylic group. Units A comprise from about 1 to about 99 percent by weight of said copolymer and units B comprise from about 99 to about 1 percent by weight of said copolymer. Said copolymers can be block copolymers, "alternating" copolymers, or random copolymers. EP-A-0 315 027 also indicates that the block copolymers are useful in automotive applications, electrical appliances, and food wrappings, as stand alone resins, in blends with other resins such as polyesters, polyarylates and polyamides and as tie resins to bond two different resin layers.

Polyesteramide resins wherein R and G are the residue of 1,4-butanediol and E and Ar are paraphenylene radicals have been disclosed in U.S. Pat. No. 5,510,451 (Gaymans, et al.). Polyesteramide resins wherein R can be alkyl other than the residue of 1,4-butanediol have been disclosed in commonly owned and pending application Ser. No. 08/397,324 (Bailly, et al.), filed Mar. 1, 1995. Blends of polycarbonate resins and polyesteramide resins have been disclosed in commonly owned and pending application Ser. No. 08/397,327 (Bailly, et al.), filed Mar. 1, 1995. Blends of polyphenylene ether resins and polyesteramide resins have been disclosed in commonly owned and pending application Ser. No. 08/590,852 (Bailly, et al.), filed Jan. 24, 1996.

DESCRIPTION OF THE PREFERRED EMBODIMENTS

Polyesteramide resins (hereinafter referred to as PEA) are, per se, known in the art. PEA refers to polymers comprising units represented by the amide formula (I):

and the ester formula (II):

The PEA of the present invention are substantially aliphatic PEA. Substantially aliphatic PEA refers to PEA containing at least about 10 mol %, preferably at least about 20 mol %, aliphatic residues in the PEA.

In a broad sense, polymers containing all ratios of formula (I) to formula (II) are possible and at the extreme where the amount of formula (II) in the polymers approaches zero, the polymers would be polyamide resins and conversely, where the amount of formula (I) in the polymers approaches zero, the polymers would be known as polyester resins. For the present invention, it is preferred that the ratio of units of formula (I) to units of formula (II) be about 1 to 1 or less, preferably about 1 to 3 or less.

The amide formula (I) is generally derived from a reaction between (i) compounds having at least one amine group, represented by general formula (III):

and (ii) compounds having at least one moiety having a carbonyl group, or a moiety capable of forming a carbonyl group, and capable of reacting with the amine of formula (III), and represented by the general formula (IV):

In formula (III), each $R_1$, $R_2$, and $R_3$ can independently be a hydrogen, a $C_{1-20}$ alkylene or $C_{6-20}$ arylene group with the proviso that at least one of $R_1$, $R_2$, or $R_3$ be either a hydrogen or a good leaving group, and with the proviso that at least one of $R_1$, $R_2$, or $R_3$ also contain at least one reactive moiety selected from the group consisting of amine, hydroxyl, carboxylic acid, imido, anhydride, ester, epoxy, carboxylic acid salt, or mixtures of the foregoing. Illustrative examples for formula (III) include:

ammonia,
dimethylenediamine,
trimethylenediamine,
tetramethylenediamine,
pentamethylenediamine,
hexamethylenediamine,
trimethylhexamethylenediamine,
m-phenylenediamine,
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;

2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane; benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylendiamine;
2,11-dodecanediamine;
2,2-dimethylpropylenediamine;
octamethylenediamine;
3-methoxyhexamethylenediamine;
2,5-dimethylheptamethylendiamine;
2,5-dimethylheptamethylendiamine;
3-methylheptamethylenediamine;
5-methylnonamethylenediamine;
1,4-cyclohexanediamine;
1,12-octadecanediamine;
isophorondiamine;
bis(3-aminopropyl)sulfide;
N-methyl-bis(3-aminopropyl)amine;
heptamethylenediamine;
nonamethylenediamine;
decamethylenediamine;
aminophenyl sulfone;
aminophenyl acetic acids;
4-(4-aminophenyl)butyric acids;
4-amino-1,8-naphthalic anhydride;
3-amino-2-naphthoic acid;
5-amino-isophthalic acid;
2-(2-aminoethoxy)ethanol;
4-(aminomethyl)benzoic acid;
4-(aminomethyl)cyclohexanecarboxylic acid;
amino salicylic acids;
aminobenzyl alcohol;
4-aminobutanol;
4-aminobutyric acid;
N-(4-aminobenzoyl)benzoic acid;
2-(2-aminobenzoyl)benzoic acid;
1-amino-1-cyclohexanecarboxylic acid;
4-aminocyclohexanol hydrochloride; and mixtures of such amines.

In formula (IV), $R_4$ is generally a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures of the foregoing. Also in formula (IV), X is a leaving group capable of being displaced by a nucleophilic species, such as, for example, hydroxyl or amino. Preferably, X is a halogen, typically chlorine, or a hydroxyl group, or an alkoxy or aryloxy such as, for example, phenoxy, methoxy, or ethoxy. It is possible for formulas (III) and (IV) be connected to each other, for example, as in amino acids and derivatives of amino acids. Several illustrative examples wherein formula (III) and (IV) are present in the same compound are shown in the examples for the amine compounds. Preferred carbonyl-containing compounds include diesters, diacids, diacid chlorides, monoacid-monoesters, and monoester-monoacid chlorides represented by formula (V):

$$X-\overset{\overset{O}{\|}}{C}-Y-\overset{\overset{O}{\|}}{C}-X \qquad (V)$$

wherein Y is a divalent aliphatic containing at least 2 carbon atoms or aromatic group containing at least 6 carbon atoms, and X is as previously described for formula (IV). Illustrative carbonyl containing compounds of formula (V) include aliphatic diacids such as sebacic acid, octadecanedioic acid, suberic acid, glutaric acid, pimelic acid, and adipic acid; aromatic diacids such as the various terephthalate and isophthalate diacids and naphthalate diacids; as well as the mono- or di-acid halides and lower mono-or di-alkyl and aryl esters of all of the foregoing aliphatic and aromatic diacids. Trifunctional or multifunctional carboxylic acids may also be incorporated to make branched structures.

In a preferred embodiment, formula (III) is a lower alkylene diamine and formula (IV) is an aromatic phthalate or naphthalenedicarboxylate derivative. Preferred diamines are dimethylenediamine, trimethylenediamine, tetramethylenediamine, pentamethylenediamine, octamethylenediamine, hexamethylenediamine, trimethylhexamethylenediamine. Preferred aromatic phthalate and naphthalenedicarboxylate species include terephthalic acid, isophthalic acid, and 2,6-naphthalenedicarboxylic acid and lower alkyl and aryl esters, acid halides and mixed anhydrides.

The ester of formula (II) is generally derived from a reaction between (i) compounds having at least one hydroxyl group, represented by general formula (VI):

$$HO-R_5 \qquad (VI)$$

and (ii) compounds generally represented by formula (IV) having at least one moiety having at least one carbonyl group, or a moiety capable of forming a carbonyl group, and capable of reacting with the hydroxyl compound of formula (VI) to result in an ester or ester precursor.

In formula (VI), $R_5$ is generally a $C_{1-20}$ alkylene or $C_{6-20}$ arylene group that also contains at least one moiety selected from the group consisting of amine, hydroxyl, carboxylic acid, imido, anhydride, ester, epoxy, carboxylic acid ammonium or metal salt, or mixtures of the foregoing. As with formulas (III) and (IV), it is also possible for formulas (IV) and (VI) to be contained within the same compound. Illustrative examples include hydroxy benzoic acid, 3-hydroxybenzoic acid, 3-hydroxypicolinic acid, hydroxynicotinic acids, 4-hydroxyproline, and including caprolactone among various other lactones. The preferred hydroxy compounds include the aliphatic diols such as 1,4-butanediol, 1,2-ethanediol, 1,6-hexanediol, 1,4-cyclohexanedimethanol, 1,2-propanediol and 1,3-propanediol.

When the amine in formula (III) is a diamine, the amide of formula (I) can become a diamide comprising units represented by the general formula (VII):

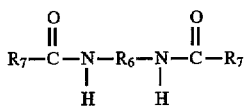
(VII)

wherein $R_6$ is a $C_{1-20}$ alkylene or $C_{6-20}$ arylene group and $R_7$ is as previously defined for $R_4$ in formula (IV).

Optionally, it is possible for the diamide or mixtures of diamides to have the formula (VIII):

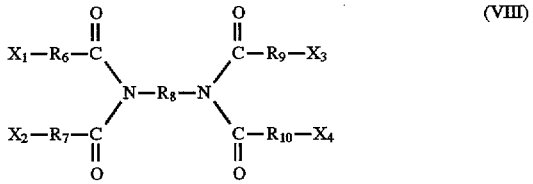
(VIII)

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from hydroxy, carboxylic acid, a lower alkyl or aryl ester of a carboxylic acid, epoxy, carboxylic acid ammonium salt or an anhydride, or hydrogen provided that at least on of $X_1$ or $X_2$ and $X_3$ or $X_4$ are not hydrogen.

In a preferred embodiment, the carbonyl species of formula (VI) is a bis-carbonyl species and the resultant amide of formula (I) comprises units represented by the general formula (IX):

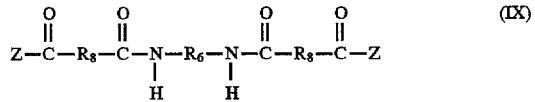
(IX)

wherein Z is either a leaving group capable of being displaced by a hydroxyl or amino group or other nucleophilic species. Preferably, Z is a halogen, typically chlorine, or a hydroxyl group, or an alkoxy or aryloxy such as, for example, phenoxy, methoxy, or ethoxy. In formula (IX), $R_6$ is as previously defined in formula (VIII), and each $R_8$ independently is generally $C_{1-20}$ alkylene, or $C_{1-20}$ arylene, or mixtures of the foregoing. Preferably $R_6$ is a 1,2-ethylene or 1,4-butylene group and each $R_8$ is para-phenylene.

When Z is an alkoxy or aryloxy group in formula (IX), the resultant formula can be referred to as a "bisester diamide" (referred to as BEDA hereinafter), e.g., a bisester diamide based on terephthalic acid or its derivative and diamine or its derivative.

For purposes of simplicity and future reference in the examples, in formula (IX) when Z is methoxy, $R_8$ is p-phenylene, and $R_6$ is tetramethylene, the resulting compound is abbreviated as T4T-dimethyl. Similarly, in formula (IX) when Z is methoxy, $R_8$ is p-phenylene, and $R_6$ is hexamethylene or ethylene, the resulting compounds are abbreviated as T6T-dimethyl and T2T-dimethyl, respectively.

PEA having a substantially uniform structure are preferable and are derived from diacid derivatives, diols and diamines. The preferred PEA contain the general formula (X):

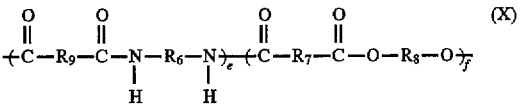
(X)

wherein $R_6$, $R_7$, $R_8$, and $R_9$ are independently $C_{1-20}$ alkylene or $C_{1-20}$ arylene and wherein e and f are each an integer greater than or equal to 1. Preferably, $R_7$ and $R_9$ are the same and are arylene, preferably a para-phenylene radical and preferably $R_6$ and $R_8$ are the same and are $C_{2-6}$ alkylene. It is preferable for e to be 1 or a mixture of 1 and higher integers wherein the fraction of said higher integers is less than about 15%, and more preferably less than about 10%. It is also possible for e and f to each be 1, in which case the resulting polymer would be a purely alternating polyesteramide. It is also preferable for the ratio of e/f to be between about 0.005 and about 1, more preferably between about 0.05 and 0.5, and for the PEA to have an inherent viscosity [$\eta_{inh}$] exceeding 0.4 dl/g, as determined in phenol/tetrachloroethane (50:50 vol) at 25° C. using a solution of 0.5% w/v solution.

In formula (X), when $R_7$ and $R_9$ are the same, preferably para-phenylene, the polymer comprising units of formula (X) can be referred to as a Pst, wherein s refers to the number of carbon atoms in $R_8$, and t refers to the number of carbon atoms in $R_6$. For example, the PEA derived from 1,4-butanediol and tetramethylenediamine as the diol and diamine respectively would be referred to as P44 and the PEA derived from 1,2-ethanediol and tetramethylenediamine would be referred to as P24. To designate the mole percentages of diamine based on the total of diol and diamine, the mole percentage of diamine is commonly designated as Pst-%. According to this nomenclature scheme, a PEA derived from tetramethylenediamine and 1,2-ethanediol wherein the tetramethylenediamine is at a level of 20 mole percent, would be referred to as P24-20.

The term "uniformity" or the "degree of uniformity" as it refers to the structure of the PEA indicates the molar fraction of units with e=1 relative to the sum of the units with e=1,2,3,4 . . . Units with e=1 and e=2, etc. can be discerned by NMR So:

$$\text{"Degree of uniformity"} = \frac{(\text{units with } e = 1)}{(\text{units with } e = 1) + (\text{units with } e = 2) + (\text{units with } e = 3) \text{ etc.}}$$

Although it is possible to employ PEA having either block or random structure, it is especially preferred that the PEA have a substantially uniform structure. By substantially uniform structure, it is meant that the degree of uniformity is high, e.g., greater than about 0.70 preferably greater than 0.85 and most preferably greater than 0.90. By having a substantially uniform structure, both the blends of PEA and polyesters and the blends of PEA and polyesters with polycarbonates have surprisingly high Vicat softening temperature and high crystallization rates. As the PEA having substantially uniform structure are the most preferred, the remaining description will focus on these materials, it being understood that normal PEA with random and block structures are also contemplated.

It has been found that blends of PEA built up from units preferably originating from terephthalic acid, 1,4-butanediol and 1,4-butanediamine (i.e., a P44 resin) have exceptionally good properties. For example, the Vicat temperature of the polyester/polycarbonate/PEA blends is significantly better than the corresponding polyester/polycarbonate blend. Other beneficial properties which should be obtained by the blends of the present invention include increased crystallization rate, decreased water absorption, increased paint adhesion to the blend, better chemical resistance, an increase in flow for a given glass transition of the blend, and a decrease in the degree of transesterification. The improvements in these properties are compared to the corresponding blends of PC/poly(butylene terephthalate) with similar weight ratios of PC to poly(butylene terephthalate) as the ratios of PC to the sum or poly(butylene terephthalate) and PEA. Poly(butylene terephthalate) is hereinafter referred to as "PBT".

Applicants have also discovered that most of the above properties are even better when a PEA having a uniform structure is employed. For example, Applicants have discovered that increasing the degree of uniformity on the PEA has a positive effect on the Tm and the crystallization rate of PEA resins and also on the properties of PEA in the blend with polyester and/or polycarbonate. Another surprising advantage of a highly uniform PEA is a low amino end group content in PEA originating from amide block impurities in BEDA. For that reason the number of repeat units of formula 7, i.e. units originating from diamine, which is present next to each other in the copolyester amide (e>1), is preferably not more than 15% of the overall number of e-units of formula (IX).

In contrast with what is usual in PC/PBT blends, a diminished drop in melting and crystallization temperatures occurs in the blends of polycarbonate, PBT, and PEA according to the present invention. In the blends of PC and PEA according to the invention, the melting and crystallization temperatures of PEA are essentially constant which is in sharp contrast with the corresponding blends of PC and polyester (i.e., PBT) having a comparable viscosity. The polyester (i.e., PBT) generally shows a drop in the melting point and crystallization temperature in PC/PBT blends.

As mentioned above, the viscosity of the PEA, i.e. the measure for the molecular weight $[\eta_{inh}]$, preferably exceeds 0.4 dl/g, and more preferably exceeds 0.6 dl/g. The viscosity has been determined in phenol/tetrachloroethane (50/50 (vol)) at 25° C. using a 0.5% w/v solution. These viscosities have been determined to provide a good mix of mechanical properties which are particularly desirable for the finished blend; e.g., both the elongation at break, and the impact strength are good when the viscosity exceeds about 0.4 dl/g. There is, however, no special advantage for increasing the viscosity beyond about 5.0 dl/g. Rather, when the viscosity exceeds about 5.0 dl/g, very special conditions have to be used for processing the material. Consequently, viscosities above about 5.0 dl/g are not preferred.

The PEA according to the invention are particularly well suited for blending with polyesters and/or polycarbonate resins because they have a number of unexpected and special properties. This was somewhat unexpected because it was questionable whether successful blends containing PC could be made at all given the susceptibility of PC for age-type impurities and/or end groups and the weakness of ester groups at PC processing temperatures. First of all, the melting temperature of the blend has been increased with respect to the melting temperature of the corresponding blend with polyesters, i.e. PBT. This is particularly surprising, since on the basis of prior art data, it might be expected that it would have been lower. The variation of the modulus at temperatures above the glass transition temperature is also surprisingly favorable. In fact the modulus shows a considerably smaller decline than is usual, so that the temperature range within which the products according to the invention are useful, is much larger.

As a result, new possibilities are opened for a great number of new applications. The blends of polyesters with PEA, optionally containing polycarbonates, according to the invention constitute a class of polymers having a wide range of applications due to the rapid crystallization and extent of ordering in the solid state. The resistance to solvents is particularly good, and the water absorption is very low. The PEA according to the invention may also be used inter alia as an "engineering plastic" for blending with polycarbonate. As such, it is also possible to manufacture the PEA with a "random" distribution of the units e and f. However, a considerably better combination of properties is obtained when the degree of uniformity is high.

The major components of the PEA according to the invention originate from 1,4-butanediamine, 1,4-butanediol, and terephthalic acid. However, it is also possible to replace a minor quantity of these components by other corresponding components. It is preferred, however, that these other components not adversely influence the properties of the PEA. For this reason, usually not more than 10 mol. % of each component should be replaced by another component. This quantity is preferably not more than about 5 mol. %, and most preferably about 0%.

The preparation of the PEA according to the invention may be carried out in various manners. According to a first embodiment, it is done in a number of steps. A bisester diamide is prepared in a first step by reaction of a diamine with at least a two fold molar quantity of a diester of terephthalic acid, for example, dimethyl terephthalate. This reaction is generally carried out in the presence of a catalyst, for example, Li(OCH$_3$). The use of a catalyst is not necessary, but in general has a positive influence on the course of the reaction. If the reaction is carried out starting from a mixture of all components which are provided in the reactor prior to the beginning of the reaction, a rather large excess of diester (about 400%) should be used so as to obtain an optimum product. It has surprisingly been found that it is also possible to prepare the product with a high yield using a small excess of diester (about 150%). It is also possible to start from the diamine and p-carboalkoxyl-benzoyl chloride.

A mixture of the bisester diamide, a diol and optionally terephthalic acid, or a terephthalic acid derivative, is then condensed to form a prepolymer. This prepolymer may finally be postcondensed to form a PEA having the desired properties.

The conditions for the preparation of PEA known in the literature may be used for the prepolymerization, but it is preferred to perform the prepolymerization at a temperature less than about 260° C., at a low pressure, preferably less than about 1 mm Hg, for at least about 20 minutes and preferably of least about 40 minutes. This second phase may be carried out at a temperature between about 230° and about 300° C., at low pressure, preferably less than about 1 mm Hg., for at least about 30 minutes, and then at a temperature of less than about 230° C. at a pressure of less than about 5 bar, for about 45 to about 120 minutes.

The prepolymer thus obtained may optionally be postcondensed in the conventional manner in the solid state at a temperature between about 175° C. and a few degrees below the melting point of the polymer, in the presence of an inert gas or under vacuum or under vacuum with a stream of inert gas.

Another method of preparing the PEA according to the invention comprises adding together a diol, a diamine, and a dialkyl terephthalate, terephthalic acid, or a terephthalate derivative, followed by increasing the temperature of the mixture to a value between about 150° C. and about 200° C.

When the boiling temperature of the diamine is below about 150°–200° C., it is preferred to close the reactor, apply a prepressure or recycle the diamine. In this manner a prepolymer having a reasonable degree of order is obtained, which prepolymer may be postcondensed to the desired molecular weight. An advantage of this method is that it can be carried out in one reactor without intermediate isolation and/or purification steps, which may have important practical advantages.

Yet another method that may be employed involves bringing together a mixture of the diol and the diester at the indicated reaction temperature and then gradually adding the diamine. In this manner the advantage of a one-reactor method is still present, while an excellent product is obtained.

By varying the ratio of diester, diol and terephthalic acid derivative, PEA may be obtained with various ratios between ester and amide groups.

In the above description, terephthalic acid or a derivative thereof is used as a starting material for the preparation of the copolyester amide. This includes, in principle, any terephthalic acid derivative which may be used for this purpose, notably the diesters of terephthalic acid having a splittable ester group, for example, a lower alkyl group ($C_1$–$C_4$). In this regard, it is noted that it is also possible to start from a dicarboxylic acid other than terephthalic acid, for example, 2,6-naphthalenedicarboxylic acid, provided that the dicarboxylic acid has the same or similar structural properties in the PEA according to the invention as terephthalic acid.

To the extent that the uniform or ordered structure on the polyesteramide is not desired or necessary, it is also possible to prepare the polyesteramide according to the process set forth in U.S. Pat. No. 2,856,385.

Polyesters suitable for use as Component B of the present compositions include those comprising structural units of the formula (XI):

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (XI) are poly(alkylene dicarboxylates), elastomeric polyesters, liquid crystalline polyesters, polyarylates, and polyester copolymers such as copolyestercarbonates and polyesteramides. Also included are polyesters based upon hydroxy carboxylic acids, and preferably hydroxy aromatic carboxylic acids such as, for example, hydroxy benzoic acids and hydroxynaphthoic acids. Polyesters that have been treated with relatively low levels of diepoxy or multi-epoxy compounds are also within the scope of useful polyester resins. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

It is preferred for at least some of the polyester to contain nucleophilic groups such as, for example, carboxylic acid groups. In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^1$ radical of formula (IX) may be, for example, a $C_{2-10}$ alkylene radical, a $C_{6-10}$ alicyclic radical, a $C_{1-20}$ aromatic radical or a polyoxyalkylene radical in which the alkylene groups contain about 2–6 and most often 2 or 4 carbon atoms. The $A^1$ radical in the above formula (IX) is most often p- or m-phenylene or a mixture thereof. This class of polyesters includes the poly(alkylene terephthalates), the poly(alkylene naphthalates) and the polyarylates. Polyesters are known in the art as illustrated by the following U.S. Patents, which are incorporated herein by reference.

| 2,465,319 | 2,720,502 | 2,727,881 | 2,822,348 |
|---|---|---|---|
| 3,047,539 | 3,671,487 | 3,953,394 | 4,128,526 |

The poly(alkylene terephthalates), for example, poly (ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly (butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, aliphatic or aromatic dicarboxylic acids, and aromatic hydroxy carboxylic acids are also useful. Examples of useful liquid crystalline polyesters are those described in U.S. Pat. Nos. 4,664,972 and 5,110, 896, which are incorporated herein by reference. Various mixtures of polyesters are also sometimes very suitable.

The various polyesters can be distinguished by their corresponding glass transition temperatures (e.g., Tg) and melting points (e.g., Tm). The liquid crystalline polyesters generally have Tg's and Tm's that are higher than the naphthalate-type polyesters. The naphthalate-type polyesters generally have Tg's and Tm's that are higher than the terephthalate-type polyesters. Thus, the resultant PEA alloys with the liquid crystalline or naphthalate-type polyesters are typically better suited to applications requiring higher temperature resistance than are the terephthalate-type polyesters. The PEA alloys with terephthalate-type polyesters are generally easier to process due to the polyesters' lower Tg's and Tm's. Selection of the polyester or blend of polyesters utilized is therefore determined, in part, by the desired property profile required by the ultimate end-use application for the PEA-polyester alloy.

The polyester may include structural units of the formula (XII):

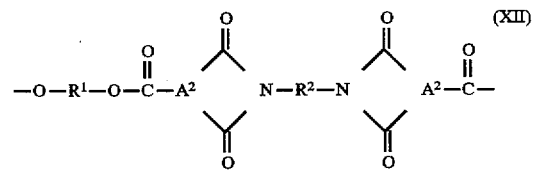

wherein $R^1$ is as previously defined for formula (IX) and $R^2$ is a polyoxyalkylene radical and $A^2$ is a trivalent aromatic radical, usually derived from trimellitic acid and has the structure (XIII):

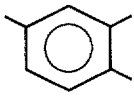

(XIII)

Such polymers and their mode of preparation are described for example in U.S. Pat. Nos. 4,544,734, 4,556,705, and 4,556,688, which are incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

The polycarbonates which can be blended with the PEA of the present invention, as well as their methods of preparation, are well known in the art. Most preferred among the polycarbonates is a polymer containing a substantial proportion of aromatic polycarbonate units. Substantial proportion generally means greater than about 20 percent by weight of polycarbonate units in the polymer. Amongst the preferred polymers of this type are the polycarbonate resins. The polycarbonate materials comprise structural units of the formula (XIV):

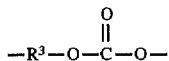

(XIV)

wherein $R^3$ is a divalent organic radical

Suitable $R^3$ values in formula (XIV) include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^3$ radicals are hydrocarbon radicals although mixtures of various radicals may also be useful.

Although $R^3$ in formula (XIV) can be any ratio of alkylene to arylene radicals, preferably, at least about 60% and more preferably at least about 80% of the total number of $R^3$ values in the cyclic oligomer mixtures, and most desirably all of said $R^3$ values, are aromatic. The aromatic $R^3$ radicals preferable have the formula (XV):

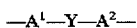

(XV)

wherein each of $A^1$ and $A^2$ is a monocyclic divalent aromatic radical and Y is a bridging radical in which one or two atoms separate $A^1$ form $A^2$. The free valence bonds in formula (XV) are usually in the meta or para positions of $A^1$ and $A^2$ in relation to Y.

In formula (XV), the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferable p-phenylene, although both may be o-phenylene or m-phenylene, or one o-phenylene or m-phenylene and the other p-phenylene.

In formula (XV) the bridging radical, Y, is one in which one or two atoms, preferable one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula (XV) is the 2,2-bis(4-phenylene)propane radical, which is derived from bisphenol A and in which Y is isopropylidene and $A^1$ and $A^2$ are each p-phenylene.

A common method of preparing the aromatic polycarbonates is by the interfacial polymerization technique; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor). Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins used as components of the blends the invention comprises a phosgenation reaction. The temperature at which the phosgenation reaction proceeds may vary from below about 0° C. to above about 100° C.

The carbonate precursor can be either a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

The weight average molecular weight of the polycarbonate material should be at least about 40,000 (as determined by gel permeation chromatography relative to polystyrene). It is most often in the range of about 40,000–80,000. However, compositions in which polycarbonate has a higher molecular weight often have favorable ductility at the expense of decreased flow. The exact molecular weight utilized will depend, in part, on the end-use requirements of the desired application and the degree of molding difficulty encountered in forming the part.

The term "aromatic polycarbonate" as used herein is inclusive of block a segmented polycarbonates as well as poly(ester-carbonate) resins (also commonly referred to at times as copolyester-polycarbonate resins). Block and segmented polycarbonates include polycarbonate copolymers with polysiloxane resins or poly(phenylene ether) resins. Examples of illustrative block and segmented polycarbonates can be found in U.S. Pat. Nos. 4,945,148, 4,994,532, 4,973,628, 5,011,899, and 5,455,310, the disclosures of all are hereby incorporated by reference. The poly(ester-carbonate) resins (referred to hereinafter as "PEC") used in the blends of the present invention are per se well known and may be prepared by either melt polymerization or by interfacial polymerization.

Melt polymerization for preparing polycarbonates involves coreacting, for example, diphenyl carbonate with various mixtures of dihydric phenols and ester precursors such as, for example, diphenyl derivatives of iso- and terephthalates, and their mixtures. Various catalysts or mixtures of catalysts such as, for example, lithium hydroxide and lithium stearate can also be used to accelerate the polymerization reactions.

In general, the method of interfacial polymerization comprises the reaction of a dihydric phenol with a carbonate precursor in the presence of an ester precursor. Examples of interfacial polymerization techniques can be found in U.S. Pat. Nos. 3,169,121 and 4,487,896 which are incorporated herein by reference.

Although the reaction conditions of the preparative processes may vary, several of the preferred processes typically involve dissolving or dispersing dihydric phenol reactants in aqueous caustic, combining the resulting mixture with a suitable water immiscible solvent medium and contacting the reactants with the carbonate precursor, such as, for example, phosgene, in the presence of a suitable catalyst and under controlled pH conditions. The most commonly used water immiscible solvents include methylene chloride, 1,2-dichloroethane, chlorobenzene, toluene, and the like.

Advantageously a catalyst may be added to the reaction mixture to promote the reaction. The catalyst typically accelerates the rate of polymerization of the dihydric phenol reactants with the carbonate precursors. Representative catalysts include but are not limited to, for example, tertiary amines such as triethylamine, quaternary phosphonium compounds, quaternary ammonium compounds, and the like.

The preferred process for preparing PEC comprises a phosgenation reaction. The temperature at which the phosgenation reaction proceeds may vary from below about 0° C. to about 100° C. The phosgenation reaction preferably proceeds at temperatures of from about room temperatures (about 23° C.) to about 50° C. Since the reaction is exothermic, the rate of phosgene addition may be used to control the reaction temperature. The amount of phosgene required will generally depend upon the amount of the dihydric phenol reactants added.

The dihydric phenols employed are known, and the reactive groups are thought to be the phenolic hydroxyl groups. Some of the dihydric phenols are represented by the general formula (XVI):

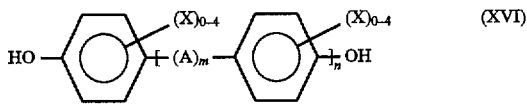

wherein A is a divalent hydrocarbon radical containing from 1 to about 15 carbon atoms or a substituted divalent hydrocarbon radical containing from 1 to about 15 carbon atoms and substituent groups such as halogen; —S—; —SS—; —S(O)—; —S(O)$_2$—; —O—; or —S(O)—; each X is independently selected from the group consisting of hydrogen, halogen, and a monovalent hydrocarbon radical such as an alkyl group of from 1 to about 8 carbon atoms, an aryl group of from 6 to about 18 carbon atoms, an aralkyl group of from 7 to about 14 carbon atoms, and alkaryl group of from 7 to about 14 carbon atoms, and alkoxy group of from 1 to about 8 carbon atoms; and m is 0 or 1 and n is an integer of from 0 to about 5.

Typical of some of the dihydric phenols employed are bis-phenols such as (4-hydroxy-phenyl)methane, 2,2-bis(4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; dihydroxydiphenyl such as p,p'-dihydroxydiphenyl 3,3'-dichloro-4,4'-dihydroxydiphenyl; dihydroxyaryl sulfone such as bis(4-hydroxyphenyl)sulfone, bis(3,5-dimethyl-4-hydroxyphenyl) sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxy-phenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxy-3,5-dichlorophenyl)-propane, hydroquinone, and the like, or bishaloformates of glycol, and the like. While all of the above carbonate precursors are useful, carbonyl chloride, also known as phosgene, is preferred.

In general, any dicarboxylic acid conventionally used in the preparation of polyesters may be utilized in the preparation of poly(ester-carbonate) resins. However, the PEC used in the present invention are prepared with aromatic dicarboxylic acids, and in particular terephthalic acid, and mixtures thereof with isophthalic acid wherein the weight ratio of terephthalic acid to isophthalic acid is in the range of from about 5:95 to about 95:5, especially preferred are weight ratios of terephthalic acid to isophthalic acid is in the range of from about 40:60 to about 60:40.

Rather than utilizing the dicarboxylic acid per se, it is possible, and sometimes even preferred, to employ various derivatives of the acid moiety. Illustrative of these reactive derivatives are the acid halides. The preferred acid halides are the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride In the conventional interfacial polymerization methods of preparing PEC, polycarbonates and polyarylates, a molecular weight regulator (a chain stopper) is generally added to the reaction mixture prior to or during the polymerization reactions with carbonate and/or ester precursors. Useful molecular weight regulators include, for example, monohydric phenols such as phenol, chroman-I, para-t-butylphenol, p-cumylphenol and the like.

The proportions of reactants employed to prepare the PEC will vary in accordance with the proposed use of the blends of the invention containing this product resin. In general, the amount of the combined ester units may be from about 20% by weight to about 85% by weight, relative to the carbonate units, preferably about 40% to about 80% by weight relative to the carbonate units.

The preferred PEC for use in the blends of the present invention are those derived from reaction of bisphenol-A and phosgene with iso- and terephthaloyl chloride and having an intrinsic viscosity of about 0.5 to about 0.65 deciliters per gram (measured in methylene chloride at a temperature of 25° C.).

Also included within the blends of the present invention is the presence of randomly branched polycarbonates, randomly branched PEC, randomly branched poly(aryl ether)s, and/or randomly branched polyarylates. These randomly branched materials are sometimes useful for altering the rheological characteristics of the blends containing the linear polymers for fabrication techniques such as pressure forming or blow molding and can be used as partial or full replacements for the linear materials. The randomly branched polymers are prepared by co-reacting a polyfunctional organic compound with the afore-described dihydric phenols, carbonate and/or ester precursors. The polyfunctional organic compounds useful in making the branched polycarbonates are set forth in U.S. Pat. Nos. 3,544,514, 3,635,895 and 4,001,184 which are incorporated herein by reference. The polyfunctional compounds are generally aromatic and contain at least three functional groups which are carboxyl, carboxylic anhydrides, phenols, haloformyls, or mixtures thereof. Some nonlimiting examples of these polyfunctional aromatic compounds include 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride, and the like. The preferred polyfunctional aromatic compounds are 1,1,1-tri(4-hydroxyphenyl)ethane, trimellitic anhydride or trimellitic acid or their haloformyl derivatives.

Also included within the scope of the present invention is the use of the linear polycarbonates such as the linear polycarbonate oligomers described in U.S. Pat. No. 5,153,276, incorporated herein by reference. The linear polycarbonates may be prepared by a variety of well-known processes, including: interfacial polymerization as set forth in F. Millich and C. Carraher, Jr., eds, *Interfacial synthesis*, Vol. II, Marcel Dekker, Inc., New York (1977), Chpt. 13; and melt transesterification as described in H. Schnell, *Chemistry and Physics of Polycarbonates*, Wiley-Interscience, New York (1964), (section III, 3, A, 4).

The invention also includes compositions containing elastomeric impact modifiers compatible with any or all of the polyester, the PEA and/or the polycarbonate.

Suitable impact modifiers are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may be functionalized or may not be functionalized with for example, epoxy, anhydride, orthoester, amino, oxazolinyl, carboxy, phosphato, and the like.

Olefin polymers and copolymers employable in the invention include low density polyethylene (LDPE), high density polyethylene (HDPE), linear low density polyethylene (LLDPE), isotactic polypropylene, poly(1-butene), poly(4-methyl-1-pentene), and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

One type of olefinic elastomer useful in the present invention are copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (XVII):

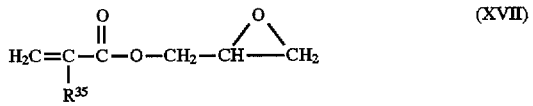

wherein $R^{35}$ represents a hydrogen atom or a lower alkyl group. Examples of the glycidyl esters of α,β-unsaturated acids include glycidyl acrylate, glycidyl methacrylate and glycidyl methacrylate. The epoxy functional olefinic elastomer is preferably an olefinic copolymer containing from about 60% to about 99.5% by weight of an α-olefin and from about 0.5% to about 40% by weight of a glycidyl ester of an α, β-unsaturated carboxylic acid, preferably from about 3% to about 30% by weight; based on the weight of the elastomer's composition. When this amount is less than about 0.5% by weight, no intended effects can be obtained and when it exceeds about 40% by weight, gelation occurs during melt-blending resulting in degradation of the extrusion stability, moldability and mechanical properties of the product. Suitable epoxy functional α- olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy function elastomers are available from Sumitomo Chemical Co. under the trademarks IGETABOND and BONDFAST and from Elf Atochem under the trademark LOTADER.

A particularly useful class of impact modifiers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylenepropylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include, e.g., polystyrene-polybutadiene (SBR), polystyrene-poly(ethylenepropylene) (S-EP), polystyrene-polyisoprene and poly(α-methylstyrene-polybutadiene. Such AB block copolymers are available commercially from a number of sources, including Phillips Petroleum under the trademark SOLPRENE, from the Shell Chemical Co. under the trademark KRATON, and from Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include polystyrene-polybutadiene-polystyrene (SBS), polystyrene-polyisoprene-polystyrene (SIS), poly(α-methyl-styrene)-polybutadiene-poly(α-methylstyrene) and poly(α-methylstyrene)-polyisoprene-poly(α-methylstyrene). Particularly preferred triblock copolymers are available commercially from Shell Chemical Co. under the trademarks CARIFLEX and KRATON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, orthoester, epoxy, amine, or anhydride. Many EPDM's and processes for the production thereof are disclosed in U.S. Pat. Nos. 2,933,480, 3,000,866, 3,407,158, 3,093,621 and 3,379,701, which are all incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, orthoester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

Also useful are the core-shell copolymers wherein an interpenetrating network of the resins employed characterizes the interface between the core and shell. Especially preferred in this regard are the ASA type copolymers available from GE Plastics under the trademark GELOY, and described in U.S. Pat. No. 3,944,631, which is incorporated herein by reference.

In addition, there may be employed the above-described polymers and copolymers having copolymerized therewith or grafted thereon monomers functional groups and/or polar or active groups. Finally, other suitable impact modifiers include Thiokol rubber, polysulfide rubber, polyurethane rubber, polyether rubber (e.g., polypropylene oxide), epichlorohydrin rubber, silicone rubbers, thermoplastic polyester elastomers and thermoplastic poly(ether-ester) and poly(ester-amide) elastomers.

The proportion of impact modifier or other resinous material is subject to wide variation. The amount of impact modifier used is generally an amount sufficient to improve the ductility of the compositions. Impact modifiers, when utilized, are usually present in an amount up to about 20 percent by weight based on the total weight of the composition.

The addition of reinforcing fillers is also contemplated for the compositions of the present invention. Suitable reinforcing fillers are those which increase the rigidity of the blend composition. Amongst these, fibrous materials are preferred, in particular glass fibers made from low alkali E-glass, having a fiber diameter from about 8 μm to about 20 μm. The length of the glass fibers in the finished molded part is typically, for example, from about 0.01 mm to about 5 mm. The glass fibers may be employed as rovings or as chopped or milled glass fibers, and may be provided with a suitable finish and an adhesion promoter or promoter system based on silanes. The amount of reinforcing fillers is advantageously from about 5 weight percent to about 60 weight percent, especially from about 10 weight percent to about 40 weight percent based on the total weight of the composition.

Other fibrous reinforcing materials, e.g. carbon fibers, potassium titanate single-crystal fibers, wollastonite, gypsum fibers, aluminum oxide fibers or asbestos may also be utilized. Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler can range from 0% to about 50% by weight based on the total weight of the entire composition.

The compositions of the present invention may also contain at least one polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XVIII):

(XVIII)

wherein $R^{45}$ is hydrogen, lower alkyl or halogen; Y is hydrogen, vinyl, halogen or lower alkyl; and f is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–65% styrene and about 2–35% diene monomer. These rubber modified polystyrenes include high impact polystyrene (commonly referred to as HIPS). Non-elastomeric block copolymer compositions of styrene and butadiene can also be used that have linear block, radial block and tapered block copolymer architectures. They are commercially available from such companies as Fina Oil under the trademark FINACLEAR resins and from Phillips Engineering Resins under the trademark K-RESINS.

The alkenylaromatic compound when present is generally used in the range from about 1% to about 25% by weight and preferably from about 5% to about 15% by weight; based on the weight of the total composition.

The present invention also contemplates the use of effective amounts of at least one additive selected from the group consisting of flame retardants, drip retardants, dyes, pigments, colorants, stabilizers, antistatic agents, nucleating agents, plasticizers and lubricants. These additives are known in the art as are their effective levels and methods of incorporation. Effective amounts of the additives vary widely, but they are usually present in an amount from about 0.1% to 50% by weight, based on the weight of the entire composition.

The PEA-containing blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in melt compounding methods include: co-rotating and counter-rotating extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with one of the primary polymer components, polyester, polycarbonate, and polyesteramide copolymers. It appears that certain properties, such as impact strength and elongation, are sometimes enhanced by initially precompounding the polycarbonate and/or polyesteramide with at least one of the typical additives identified above. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention.

The blends accordingly to the present invention provide a number of advantageous properties over the corresponding polyester or blends of polyester and polycarbonate. First of all, the Vicat or the glass transition temperatures of the polymers in the polyester/PC/polyesteramide blends are higher than in the polyester/PC blends. This is believed to be a result of the higher degree of incompatibility between PEA and PC than is seen with the polyester (e.g., PBT) and PC. However, care must be taken that the polyester, PC, and PEA do not transesterify to a significant degree because the transesterification increases compatibility between the phases and thereby decreases the glass transition temperature of the PC-phase of the blend.

EXAMPLES

The following examples are meant to teach by way of illustration some of the embodiments of the present invention. The examples are not meant to limit the breath of the invention.

Example 1

1. Polybutylene terephthalate(PBT)

PBT was polymerized in a 1.3 liter stainless steel reactor with $N_2$-inlet, mechanical stirrer and vacuum application. 200 g DMT (1.03 Moles), 186 g BDO (2.06 Moles) and 3.75 ml $Ti(OC_3H_7)_4$ (0.175 Moles) were heated to 160° C. and then heated with 1.5° C./mm to 255° C. At about 255° C. the pressure was gradually reduced to 15–20 mBar (15 min) and further to 0.1–0.4 mBar (60 min). The polymer was removed after cooling and breaking the vacuum. Its melting temperature was 222° C., crystallization temperature 186° C., and $\eta_{inh}$ was 1.39 dl/g measured as 0.5 g/dl solution in phenol/tetrachloroethane (50:50 vol) at 25° C., corresponding to a molecular weight of 93000.

2. T4T-dimethyl 88 g dimethylterephthalate, 210 ml DMF and 210 ml toluene were placed in an oil heated 1 L glass reactor equipped with Dean-Stark trap, reflux cooler, stirrer and nitrogen inlet, and were heated under nitrogen to about 140° C. 8 g 1,4-diaminobutane and 0.65 g $LiOCH_3$ were added. The solution was stirred for about 4 hours at about 140° C. during which a precipitate formed. The precipitate was hot-filtered, washed with hot toluene and hot methanol and was dried at about 175° C. during 1 hour. Yield was 82%.

3. T2T-dimethyl

The same procedure as used for T4T-dimethyl was applied with the exception that 1,4-diaminobutane was replaced by 1,2-diaminoethane, and 0.95 g $LiOCH_3$ were used. The yield was 72% and the melting point was 295° C.

4. T6T-dimethyl

The same procedure used for T2T-dimethyl was applied with the exception that 1,2-diaminoethane was replaced by 1,6-diaminohexane. The yield was 79% and the melting point was 234° C.

5. T4T-dimethyl purity

T4T-dimethyl can be considered to contain 1.5 repeat unit of polyamide 4,T. With the procedure used for T4T-dimethyl, inevitably some material with 2.5 (=T4T4T-dimethyl) and 3.5 repeat units is possibly made, which in a P44-copolymer leads to segments with e=2, 3, etc. Due to precipitation during the reaction, the fraction of oligomers higher than T4T4T-dimethyl is not generally large. With 13-C NMR it is possible to quantify 4T4 sequences, and by that the purity of the product with respect to T4T-dimethyl content of the product. Therefore, the procedure used for T4T-dimethyl was repeated, but with different toluene/DMF ratios. With increasing ratios the amount of T4T4T decreased, though the reaction yield decreased as well. Data illustrating the effects of toulene/GMF ratios on yield and T4T-dimethyl is provided in Table 1a.

TABLE 1a

| Toulene (ml) | DMF (ml) | Yield (%) | T4T-dimethyl (%) |
|---|---|---|---|
| 370 | 50 | 66 | 96 |
| 100 | 120 | 81 | 92 |
| 210 | 210 | 82 | 85 |

6. Lithium alcoholates for the T4T.dimethyl synthesis

Lithium alcoholate catalyst was synthesized by reaction of LiH or metallic lithium with an alcohol m toluene solution. With this method several catalysts were prepared and their activity was tested in the bisester diamides reactions. This example confirmed that any linear aliphatic alcohol, or diol having preferably high boiling points or electron donating groups, e.g. dimethylamino-propanol and other related alcohols, were able to form active catalysts for the synthesis of the T4T.dimethyl. Table 1b below indicates the obtained yields with the minimum catalyst content:

TABLE 1b

| Compound | Amount (mmol) | Yield (%) |
|---|---|---|
| Li-diethylaminoethanol | 2 | 66 |
| Li-dimethylaminoethanol | 6.5 | 80 |
| Li-Octanolate | 0.9 | 80 |
| Li-Hexanolate | 2.5 | 80 |
| Li-Butanolate | 7.5 | 60 |
| Li-Methanolate | 19 | 85 |

7. P44-5 from preformed T4T-dimethyl

To a 1 l glass reactor equipped with Dean-Stark trap, condenser, stirrer, nitrogen and vacuum port was added 337 g dimethylterephthalate (1.735 Moles), 37 g T4T-inlet dimethyl (0.089 Moles) and 263 g 1,4-butanediol (BDO). Using an oil bath, the contents were heated to 165° C. and allowed to dissolve while stirring. 0.46 cc Ti(OC$_4$H$_9$)$_4$ were added and methanol started to distill off. The temperature was raised to about 235° C. in 30 min. After collection of 160 ml distillate, the Dean-Stark trap and condenser were replaced by a vacuum-line with cold trap. Vacuum was applied gradually to a pressure of about 5 mm Hg. When the viscosity started to rise, the temperature was increased to 250° C. and the pressure reduced to about 0.1 mm Hg. The polymerization was discontinued when the melt started to wrap itself around the stirrer. The melting temperature of the polymer, determined as the peak-maximum of the second heating scan in DSC (20° C./min), was 226° C. The crystallization temperature, obtained from the consecutive cooling scan (20° C./min) was 190° C. Molecular weight, determined by GPC at 40° C. in m-cresol/chloroform (10/90), was 93.000, referenced to PS-calibration standards.

8. P44-10 from preformed T4T-dimethyl

A procedure analogous to that for P44-5 was used, starting with 300 g DMT, 74 g T4T-dimethyl and 263 g BDO. The resulting polymer had a melting temperature of 231° C., a crystallization temperature of 190° C. and a molecular weight (GPC) of 81000.

9. P44-15 from preformed T4T-dimethyl

A procedure analogous to that for P44-5 was used to prepare P44-15, which had melting temperature of 239° C., a crystallization temperature of 219° C. and a molecular weight of 71000.

10. P44-20 from preformed T4T-dimethyl

A procedure analogous to that for P44-5 was used, starting from 226 g DMT, 148 g T4T-dimethyl and 263 g BDO. The final polymerization temperature had to be increased to about 260° C. due to the higher melting temperature of the final copolymer, which was 252° C. Its crystallization temperature was 222° C. and its molecular weight 34000. Postcondensation during 24 hours at about 240° C. in nitrogen resulted in a molecular weight of 70000.

P44-10, P44-20 and P44-25 were polymerized analogously to the procedure for PBT. For example, in the case of P44-20, 100 g T4T.dimethyl (0.242 mol), 142 g DMT (0.729 mol) and 217 g BDO (2.43 mol) were dissolved at 180° C. After addition of 3.75 ml Ti(OC$_3$H$_7$)$_4$ (0.175M), the mixture was transesterified during 30 min at 180° C. and then heated with 15° C. per 10 min to 255° C. (265° C. for P44-25). At 255° C., the pressure was gradually reduced (15 min 15–20 mbar and only 15 min 0.1–0.4 m bar). The prepolymers were still brittle and easy to pulverize for postcondensation in the solid state. P44-10, P44-20 and P44-25 were postcondensated in the solid state at 15° C. below their melting temperature (Tm 2 in Table 1c) in vacuum. The inherent viscosity increased from η$_{inh}$ to η$_{inh}$-A. The results of these experiments are summarized in Table 1c below:

TABLE 1c

| Polymer | η$_{inh}$ [dl/g] | η$_{inh}$-A [dl/g] | Tm-2 [°C.] | Tc [°C.] | uniformity [mol %] | NH2 [µeq/g] | COOH [µeq/g] |
|---|---|---|---|---|---|---|---|
| PBT-c | 1.39 | — | 222 | 186 | — | 0 | 25 |
| P44-10 | 0.47 | 2.12 | 229 | 192 | >97 | 12 | 38 |
| P44-20 | 0.58 | 1.08 | 254 | 221 | 93 | 32 | 43 |
| P44-25 | 0.39 | >0.81 | 256 | 232 | 84 | 37 | 97 |

The inherent viscosity η$_{inh}$ was measured in phenol/tetracholoroethane (50:50 mol) at 25° C., 0.5 g/dl solution. The melting temperature Tm-2 and crystallization temperature Tc were determined from the peak maximum during the second heating scan and the cooling scan respectively in a DSC (20° C./min). The uniformity of the amide unit was determined by $^{13}$C-NMR in trifluoroacetic acid (TFA-d). The amino (NH$_2$) and carboxylic acid (COOH) end group content were determined by titration.

11. P46-10 from preformed T6T-dimethyl

A procedure analogous to that for P44-5 was used, starting from 300 g DMT, 74 g T6T-dimethyl, prepared according to procedure 4 and 263 g BDO. The resulting polymer had a melting point of 213° C., a crystallization temperature of 178° C. and a molecular weight of 84000.

12. P44-5 from in situ made T4T-dimethyl

A 2 l oil heated stainless steel reactor, equipped with an anchor stirrer, torque measurement, Dean-Stark trap, condenser, and nitrogen inlet was charged with 790 g DMT and 17.9 g dry 1,4-diaminobutane and heated to about 175° C. Shortly after the mixture had become molten and transparent (visible through glass-insert) a very fine precipitate formed, and methanol distilled off. The reaction was continued for about 1 hour, after which 557 g BDO and 1.1 g Ti(OC$_4$H$_9$)$_4$ were added. The temperature was readjusted to about 165° C. and kept them for about 20 min. Methanol, followed by butanediol, distilled off, while the temperature was raised to 250° C. by 1° C./min. At this temperature vacuum was applied gradually to reach <1 mBar in about 15 minutes. The polymerization was continued until maximum torque reading was achieved, after which the vacuum was broken, the bottom valve was opened and the polymer strand pulled through a water bath. The polymer had a melting temperature of 226° C., a crystallization temperature of 188° C. and a molecular weight of 59000. Residual amines, measured by potentiometric titration with HClO$_4$ in m-cresol at 60° C., amounted to 22µ eq/g.

13. P44-10 via amide-salt 106 g 1,4-diaminobutane (1.2 Mole) and 200 g terephthalic acid (1.2 Mole) were dissolved in 1 L demineralized water at 60° C. The salt was precipitated by cooling to room temperature and addition of 2 L of ethanol. After filtration, washing with ethanol and drying 287 g "4T" salt were obtained. The salt was characterized with NMR and by determining its nitrogen-content. The diamino-butane: terephtalic acid ratio was 1:1 (molar). A 2 L stainless steel reactor was charged with 790 g DMT, 140 g of the "T4"-salt, 557 g BDO and 1.1 g $Ti(OC_4H_9)_4$ and heated to about 175° C. Methanol started distilling and the temperature was raised to about 250° C. in about 1.5 hours. The salt disappeared at about 210° C. Polymerization was continued during 1.5 hours under vacuum (<1 mBar) at the end of which the torque reading became maximum, the polymerization was stopped and the polymer was recovered from the reactor. Its melting temperature was 233° C., crystallization temperature 192° C., molecular weight 55000 and $HClO_4$-titratables 49 ueq/g. weight 55000 and $HClO_4$-titratables 49 ueq/g.

Example 2

Blends containing 39.43 parts of PBT or one of the above P44's, 50.19 parts PC 145, 7.5 part MBS rubber, 0.878 parts heat, light, and transesterification stabilizers and 0.5 part $TiO_2$ were compounded at 265° C. on a twin screw extruder and injection molded into test-specimen. The following properties were obtained.

TABLE 2

|  | PBT-a (ref. a) | PBT-b (ref. b) | P44-5 | P44-10 | P44-15 |  |
|---|---|---|---|---|---|---|
| Resin Properties |  |  |  |  |  |  |
| Mw (Kg/Mole) | 93 | 60 | 93 | 81 | 105* |  |
| Tm (°C.) | 226 | 226 | 226 | 231 | 239 |  |
| Tg (°C.) | 55 | 54 | 55 | 56 | 57 |  |
| Uniformity (degree) | — | — | 0.87 | 0.87 | 0.87 |  |
| Blend Properties |  |  |  |  |  |  |
| Vicat-B/120 (ISO306) | 128 | 120 | 137 | 140 | 144 | °C. |
| Izod, 23C (ISO180) | 55 | 45 | 52 | 54 | 49 | $kJ/m^2$ |
| E-modulus (ISO527) | 2200 | 2230 | 2175 | 2080 | 2135 | MPa |
| Yield stress (ISO527) | 57 | 59 | 57 | 57 | 58 | MPa |
| Elong. break (ISO527) | 135 | 110 | 121 | 125 | 115 | % |
| MVR, 260° C. (ISO1133) | 7.6 | 8.9 | 8.2 | 7.9 | 8.3 | ml/10' |
| Yellowness Index (ASTM E313) | 9.4 | 8.8 | 9.8 | 10.9 | 12.2 | — |

*After postcondensation for 24 hours at 230° C. under nitrogen.

From Table 2 it can be concluded that the Vicat softening temperature of the PC/P44 blends was significantly higher than the corresponding PC/PBT blends. Because this softening temperature is related to the glass transition of the PC-phase, the PC-phase is clearly less plasticized by P44 than by PBT, likely due to a reduced miscibility of PC with P44, compared to PC with PBT. From the mechanical properties in the above table it was surprisingly discovered that miscibility was not reduced to a level that compatibilization became necessary.

A higher Vicat temperature makes these blends more useful for automotive applications, especially because they can withstand the heat of paint ovens better.

Example 3

Various ratios of PBT ($\eta_{inh}$ 1.39 dl/g) and a P44-20 ($\eta_{inh}$ 0.58 dl/g) were melt-blended with a residence time of about 2 minutes at 270° C. using a 4 cc twin screw mini-extruder constructed by DSM-Holland and operating at about 30 RPM screw rotation speed. 0.74 wt % triphenylphosphite (TPP) was added to prevent transesterification. In these blends, the glass transition temperature of the PC-phase was determined from the second heating scan (20° C./mm) in DSC, after a first scan to 260°–270° C. and rapid quenching to 25° C. The thermal data are shown in Table 3.

TABLE 3

| Pc/PBT, PC/P44 Ratio | Tg (°C.) of PC in PC/PBT | Tg (°C.) of PC in PC/P44 |
|---|---|---|
| 100/0 (reference) | 148 | 148 |
| 90/10 | 138 | 140 |
| 70/30 | 133 | 139 |
| 50/50 | 126 | 138 |
| 30/70 | 120 | 135 |

From this table it can be derived that P44 reduces the glass transition of the PC-phase less than PBT and that the effect becomes more pronounced with decreasing PC content. This points again to the reduction in miscibility of PC and P44, compared to PC and PBT. The miscibility is however not reduced to a level that the polymers have become incompatible.

Example 4

The crystallization temperature (Tc) of the PBT- or P44-phase in blends with PC (Lexan 145, General Electric) was determined by DSC at various cooling rates. Blends or PBT of P44-20, set forth in Example 3, with 90 or 70% PC (Lexan 145) were prepared under the conditions of Example 3, were heated in DSC to 260°–270° C., kept at that temperature for 1 minute, cooled rapidly to 25° C., heated with 20° C./min to 260°–270° C. again and cooled with various rates. The crystallization temperature was taken from the peak maximum at this last crystallization temperature(°C.) of PBT or P44-20 in PC blends. The crystallization data is provided in Table 4.

TABLE 4

| | Cooling Rate (°C./min) | | | | | |
|---|---|---|---|---|---|---|
| | 10 | 20 | 40 | 80 | 120 | 160 |
| 90 PC/10 PBT | 85 | 82 | 75 | — | — | — |
| 70 PC/30 PBT | 186 | 182 | 173 | 166 | 146 | 141 |
| 0 PC/100 PBT | 190 | 187 | 178 | 172 | 153 | 149 |
| 90 PC/10 P44-20 | 224 | 218 | 214 | 197 | 189 | 182 |
| 70 PC/30 P44-20 | 224 | 221 | 215 | 198 | 189 | 182 |
| 0 PC/100 P44-20 | 225 | 223 | 216 | 200 | 191 | 186 |

As the data indicate, PBT is poorly crystallized in PC-rich blends, contrary to P44. This again points to a lower miscibility in the molten state of PC and P44 compared to PC and PBT. For PC/P44 blends a shorter cycle time on injection molding can be anticipated compared to PC/PBT blends. Because of the reduced miscibility in the molten state, a lower tendency for transesterification can be anticipated, and consequently there is less need for transesterification inhibitors.

Example 5

Blends of PCE or PPC with P44

The polyestercarbonates used are random copolymers, composed of BPA, "carbonic acid", isophthalic acid and terephthalic acid in following ratios:

TABLE 5a

|  | PCE | PPC |
|---|---|---|
| code | RL6514 | PPC 345 |
| ester/carbonate | 60/40 | 80/20 |
| Iso/tere | 45/55 | 93/7 |
| Tg (°C.) | 185 | 180 |

Blends containing 40 parts PBT or P44-15 with 60 parts of PC145 or PCE or PPC have been extruded and injection molded. All blends contain 0.078 parts phosphorous acid to suppress transesterification. The following properties have been obtained. Tm and Tc have been measured by DSC using extruded granulate, other properties have been measured on injection molded samples.

TABLE 5b

|  | PBT/PC | P44/PC | PBT/PCE | P44/PCE | PBT/PPC | P44/PPC |  |
|---|---|---|---|---|---|---|---|
| visually | opaque | opaque | almost transparent | opaque | almost transparent | opaque |  |
| Tm | 219 | 227 | 217 | 220 | 217 | 218 | °C. |
| Tc | 182 | 186 | 161 | 188 | 161 | 192 | °C. |
| Vicat | 137 | 144 | 94 | 138 | 95 | 154 | °C. |
| Heat sag | 21 | 12 | 115 | 21 | 115 | 5 | mm |
| E-mod | 2520 | 2460 | 2290 | 2380 | 2380 | 2340 | MPa |
| Yield str | 65 | 64 | 65 | 67 | 66 | 71 | MPa |
| Elog. brk. | 135 | 110 | 110 | 102 | 108 | 109 | % |

The data in Table 5b illustrates the improved thermal properties of the PEA containing blends compared to the corresponding blends containing PBT, while critical mechanical properties are not significantly affected. Transmission electron microscopy shows a coarser morphology for P44 compared to PBT containing blends. This is obviously related to reduced miscibility, which is not to such an extent that the blend-partners have become incompatible. The larger effect in PPC vs. PCE blends is particularly remarkable considering their difference in ester-content.

Heat sag is determined by means of a horizontally mounted tensile bar (ISO), clamped on one end, and allowed to bend under its own weight during 1 hour at 120° C. The vertical displacement of the free end is called the "heat sag" and is an indication of the material's behavior in paintovens.

Effect of the amide content in P44

PBT, P44-10, P44-20 and P44-25 were blended with PC (LEXAN 145):

Solution casting of the blend components was performed using a 2 wt % solution of 1,1,1,3,3,3-hexafluoro-2-propanol. The film was dried at about 25° C. overnight followed by about 5 hrs at about 150° C. in vacuo.

Solution precipitation of the blend components was preformed using at 13 g/dl solution of hot phenol/tetrachloroethane (50:50 mol). The solution was precipitated in ethanol, washed and dried at about 60° C. in vacuo overnight.

Melt blending (direct or after precipitation) was performed using a 4cc DSE mini-extruder, at conditions of 30 rpm, 270° C. and about 2 min residence time. In some cases triphenyl phosphite (TPPi) was added to inhibit transferication reactions in the melt.

After blending, the glass transition of the PC-phase (Tg of the PC-phase) was determined by differential scanning calorimetry (DSC). The Tg of the PC-phase was taken from the first heating scan (20° C./min).

Example 6

Effect of the blend ratio on the glass transition of a PC-blend.

PBT and P44-20 were each directly melt blended with PC and TPPi in a 4 cc DSE mini-extruder at the conditions of 30 rpm, 270° C. and about 2 min residence time. After blending, the glass transition of the PC-phase (Tg of the PC-phase) was determined by DSC. The Tg of the PC-phase was taken from the second heating scan (20° C./min), after quenching from 260° C. (PC/PBT) or 270° C. (PC/P44-20) to 25° C.

Example 7

Rate of crystallization of PBT and P44-20 in PC rich blends.

The crystallization behavior of PC/PBT and PC/P44-20 with blend ratios 90/10 and 70/30 wt % was determined by DSC using different cooling rates. The blends were first heated to 260° C. (PC/PBT) and 270° C. (PC/P44-20) and after one minute isothermal, were then cooled to 25° C. The crystallization temperature (Tc) of PBT and P44-20 was taken from the peak maximum during the cooling scan. In addition, the glass transition of PC (LEXAN 145) resin (Tg$_c$) was determined during a cooling scan from 260° C.

TABLE 7

Properties of PC/PBT and PC/P44-20 (both 70/30 wt %)

| Blend | Method | TPPi [wt %] | Tm [°C.] | Tc [°C.] | Tg of PC [°C.] |
|---|---|---|---|---|---|
| PC/PBT | solution casting | 0 | 218 | — | 152 |
| PC/P44-20 | solution casting | 0 | 219 | — | 151 |
| PC/PBT | solution precipitation | 0 | 220 | — | 147 |
| PC/P44-20 | solution precipitation | 0 | 248 | — | 148 |
| PC/PBT | solution precipitation + melt blending | 0 | 215 | — | 102 |
| PC/P44-20 | solution precipitation + melt blending | 0 | 253 | — | 145 |
| PC/PBT | melt blending | 0 | — | — | — |
| PC/P44-20 | melt blending | 0 | no | — | 117 |
| PC/PBT # | melt blending | 0.74 | 219 | 178 | 133 |
| PC/P44-20 # | melt blending | 0.74 | 253 | 216 | 139 |

The melting temperature (Tm) of PBT and P44-20 was determined during a first heating scan in the DSC (20° C./min) except for the samples denoted as # (second heating scan at 20° C./min). The crystallization temperature (Tc) of PBT and P44-20 was determined during a cooling scan in the DSC (20° C./min).

The glass transition of the PC-phase (Tg of PC) was determined during a first heating scan in the DSC (20° C./min).

TABLE 8

Weight average molecular weights (MW) for illustrative PEA, PC, and polyesters expressed relative to polystyrene of the polymers used in the subsequent examples 8 to 15.

| Polymer | Weight-average molecular weight |
|---|---|
| PBT I | 110,000 |
| PBT II | 46,000 |
| PET | 78,000 |
| P4,4-5 | 94,000 |
| P4,4-15 | 71,000 |
| PC | 23,000 |

TABLE 9

Description of additives used.

| ID | Composition | Vendor | Trade Name |
|---|---|---|---|
| a | pentaerythritol tetrastearate | Lonza | Glycolube (PETS) |
| b | octadecyl-3-(3,5-di-tert-buryl-4-hydroxylphenyl)-propionate | CIBA | Irganox 1076 |
| c | pentaerythritol-tetrakis-(3-laurylthiopropionate) | Sandoz | Sandostab 4020 |
| d | phosphorous acid (45% aqueous solution | Stokvis Chemicalien | Fosforigzuur 45% |

Properties are provided for examples of P4,4-5/PBT blends. All blends noted with the asterisk were compounded with 0.2 wt % of monozincphosphate. Compositions referred to as "R1 and R2" are reference compositions.

TABLE 10

| Example # | R1 | 1 | 2 | 3 | R2 |
|---|---|---|---|---|---|
| PBT I | 99.8* | 94.8* | 74.8* | 49.9* | — |
| P4, 4-5 | — | 5.0 | 25.0 | 49.9 | 100 |
| Properties | | | | | |
| $T_c$ (°C.) | 182 | 192 | 195 | 196 | 195 |
| $T_m$ (°C.) | 222 | 223 | 224 | 223 | 225 |
| MVR | 10.5 | 10.8 | 11.4 | 11.8 | — |
| Vicat (°C.) | 173 | 184 | 184 | 180 | 187 |
| INI (kJ/m$^2$) | 5.5 | 5.1 | 5.2 | 5.2 | 6.7 |
| Mod. (MPa) | 2414 | 2515 | 2519 | 2523 | 2315 |
| Yield (MPa) | 55 | 57 | 58 | 59 | 55 |
| Elong. (%) | 138 | 74 | 51 | 37 | 44 |

The blends of P4,4-5/PBT illustrated in Table 10 unexpectedly had higher modulii and yields than either the PBT and PEA alone. Also surprisingly the crystallization temperatures, melting points and Vicat temperatures are higher for the blends than for PBT alone (e.g., PBT without PEA).

Example 9

Properties are provided for examples of P4,4-15/PBT blends. All blends noted with the asterisk were compounded with 0.2 wt % of monozincphosphate. Compositions referred to as "R3, R4 and R5" are reference compositions.

TABLE 11

| Example # | R3 | R4 | R5 | 4 | 5 |
|---|---|---|---|---|---|
| PBT I | 100 | — | — | 66.7* | 49.9* |
| P4, 4-5 | — | 100 | — | — | 49.9 |
| P4, 4-15 | — | — | 100 | 33.3 | — |
| Properties | | | | | |
| $T_c$ (°C.) | 183 | 194 | 200 | 197 | 196 |
| $T_m$ (°C.) | 222 | 225 | 239 | 220 | 220 |
| Vicat (°C.) | 175 | 187 | — | 188 | 183 |
| INI (kJ/m$^2$) | 5.6 | 6.7 | — | 6.1 | 5.1 |
| Mod. (MPa) | 2355 | 2315 | — | 2529 | 2610 |
| Yield (MPa) | 53 | 55 | — | 60 | 60 |
| Elong. (%) | 35 | 44 | — | 42 | 42 |

The blends of P4,4-15/PBT illustrated in Table 11 surprisingly had crystallization temperatures substantially higher for the blends than for PBT alone (e.g., PBT without PEA). Moreover, the yield and tensile elongation were also unexpectedly increased.

Example 10

Properties are provided for examples of P4,4-5/PET blends. All blends noted with the asterisk were compounded with 0.2 wt % of monozincphosphate. Compositions referred to as "R4 and R6" are reference compositions.

TABLE 12

| Example # | R6 | 6 | 7 | 8 | R4 |
|---|---|---|---|---|---|
| PET | 99.8* | 94.8* | 74.8* | 49.9* | 0 |
| P4, 4-5 | 0.0 | 5.0 | 25.0 | 49.9 | 100 |
| Properties | | | | | |
| $T_c$ °C. | 182 | 187 | 188 | 187 | 194 |
| $T_m$ (°C.) | 248 | 248 | 248 | 248 | 225 |
| Vicat (°C.) | 80 | 113 | 153 | 153 | 187 |
| MVR | — | — | 41.8 | 29.0 | — |
| INI (kJ/m$^2$) | 3.9 | 3.4 | 3.8 | 4.1 | 6.7 |
| Mod. (MPa) | 2441 | 2694 | 2833 | 2749 | 2315 |
| Yield (MPa) | 40 | 60 | 57 | 62 | 55 |
| Elong. (%) | 2 | 4 | 5 | 14 | 44 |

The illustrative compositions of PET and PEA seen in Table 12 unexpectedly demonstrated increased crystallization temperature as well as increased modulii and yields with the addition of the PEA to the PET.

Example 11

Properties are provided for PBT/P4,4-5 blends in a standard formulation containing 42.38 weight percent PBT-I+ PEA, 45.84 weight percent PC, 11.0 weight percent MBS (methylmethacrylate-butadiene-styrene core-shell graft copolymer sold by Rohm and Haas under the tradename "Paraloid EXL-2600"), 0.3 weight percent additive "a", 0.3 weight percent additive "b", 0.1 weight percent additive "c", 0.08 weight percent additive "d". Compositions referred to as "R7 and R8" are reference compositions.

TABLE 13

| Example no. | R7 | 9 | 10 | 11 | R8 |
|---|---|---|---|---|---|
| Wt % PBT | 42.38 | 40.26 | 31.88 | 21.19 | 0 |
| wt % P4,4-5 | 0.0 | 2.12 | 10.5 | 21.19 | 42.38 |

TABLE 13-continued

| Example no. | R7 | 9 | 10 | 11 | R8 |
|---|---|---|---|---|---|
| Properties | | | | | |
| Vicat-B (°C.) | 127 | 130 | 131 | 133 | 134 |
| Heat Sag (mm) | 23 | 18 | 13 | 10 | 10 |
| MVR @ 250 C./2.16 kg (ml/10 min) | 5.8 | 5.6 | 5.4 | 5.6 | 5.9 |
| Ductile/Brittle Temperature (°C.) | −33 | −37 | −36 | −35 | −33 |
| Young's Modulus (MPa) | 2009 | 2048 | 2049 | 2033 | 2013 |
| Yield Stress (MPa) | 54 | 54 | 53 | 54 | 53 |
| Elongation (%) | 138 | 151 | 147 | 156 | 154 |

The illustrative compositions of PBT/PC as seen in Table 13 unexpectedly had substantial increases in the Vicat-B temperatures when effective amounts of PEA (P4,4-5) were added. As noted with example 9 as little as about 2 weight percent PEA increased the Vicat-B by 3° C. Also unexpectedly, the heat sag of the PBT/PC composition was also substantially improved (i.e., lower heat sag number) with the addition of an effective amount of PEA. An effective amount of PEA here is that which reduced the heat sag of the composition. Also, importantly, the ductile/brittle transition temperature was desirably reduced with increased elongation values.

Example 12

Properties are provided for PBT/P4,4-15 blends in a standard formulation containing 42.38 weight percent PBTI+PEA, 45.84 weight percent PC, 11.0 weight percent MBS (methylmethacrylate-butadiene-styrene core-shell graft copolymer sold by Rohm and Haas under the tradename "Paraloid EXL-2600"), 0.3 weight percent additive "a", 0.3 weight percent additive "b", 0.1 weight percent additive "c", 0.08 weight percent additive "d". Compositions referred to as "R9 and R10" are reference compositions.

TABLE 14

| Example no. | R9 | 12 | R4 |
|---|---|---|---|
| wt % PBT | 42.38 | 28.08 | 0 |
| wt % P4, 4-15 | 0 | 14.30 | 42.38 |
| Properties | | | |
| Vicat-B (°C.) | 129 | 131 | 138 |
| Heat Sag (mm) | 16 | 13 | 5 |
| MVR @ 250 C./2.16 kg (ml/10 mm) | 6.4 | — | — |
| MVR @ 265 C./2.16 kg (ml/10 min) | 10.5 | 9.7 | 5.1 |
| Ductile/Brittle Temperature (°C.) | −31 | −15 | >−10 |
| Young's Modulus (MPa) | 1944 | 2610 | 1849 |
| Yield Stress (MPa) | 52 | 61 | 50 |
| Elongation (%) | 119 | 42 | 136 |

The heat sag and Vicat are among the unexpected improved properties noted by addition of PEA (P4,4-15) to a PBT/PC blend.

Example 13

Properties are provided for PET/P4,4-5 blends in a standard formulation containing 42.38 weight percent PET+PEA, 45.84 weight percent PC, 11.0 weight percent MBS (methylmethacrylate-butadiene-styrene core-shell graft copolymer sold by Rohm and Haas under the tradename "Paraloid EXL-2600"), 0.3 weight percent additive "a", 0.3 weight percent additive "b", 0.1 weight percent additive "c", 0.08 weight percent additive "d". Compositions referred to as "R8 and R11" are reference compositions.

TABLE 15

| Example no. | R11 | 13 | 14 | 15 | R8 |
|---|---|---|---|---|---|
| Wt % PET | 42.38 | 40.26 | 31.88 | 21.19 | 0 |
| Wt % P4, 4-5 | 0.0 | 2.12 | 10.5 | 21.19 | 42.38 |
| Properties | | | | | |
| Vicat-B (°C.) | 108 | 132 | 131 | 132 | 134 |
| Heat Sag (mm) | 16 | 15 | 15 | 13 | 10 |
| IZOD notched Impact @ −30° C. | 16.6 | 8.6 | 16.1 | 15.8 | 38.4 |
| IZOD notched Impact @ −20° C. | 16.1 | 12.2 | 18.9 | 20.2 | — |
| IZOD notched Impact @ −10° C. | 17.1 | 10.5 | 22.6 | 19.4 | — |
| Young's Modulus (MPa) | 1958 | 2035 | 2097 | 2101 | 2013 |
| Yield Stress (MPa) | 51 | 53 | 56 | 54 | 53 |
| Elongation (%) | 150 | 105 | 105 | 123 | 154 |

Addition of an effective amount of PEA to PET/PC blends results in an unexpected increase in the Vicat-B of greater than 20° C. as noted by comparing Example 13 with control R11. In addition to the improved Vicat-B performance, increased Young's modulii and reduced heat sag are also noted by addition of effective amounts of PEA to PET/PC compositions.

Example 14

Properties are provided for PBT I/PBT II/P4,4-5 blends in a standard formulation containing 42.38 weight percent (PBTI+PBT2+PEA), 45.84 weight percent PC, 11.0 weight percent MBS (methylmethacrylate-butadiene-styrene core-shell graft copolymer sold by Rohm and Haas under the tradename "Paraloid EXL-2600"), 0.3 weight percent additive "a", 0.3 weight percent additive "b", 0.1 weight percent additive "c", 0.008 weight percent additive "d". The composition referred to as "R12" is a reference composition.

TABLE 16

| Example no. | R12 | 16 | 17 | 18 | 19 | 20 | 21 |
|---|---|---|---|---|---|---|---|
| Wt % PBT I | 16.93 | 16.08 | 15.24 | 12.70 | 8.46 | 0 | 0 |
| Wt % PBT II | 25.47 | 24.20 | 22.92 | 19.10 | 12.74 | 25.47 | 40.28 |
| Wt % P4, 4-5 | 0 | 2.12 | 4.24 | 10.60 | 21.20 | 16.93 | 2.12 |
| Properties | | | | | | | |
| MVR @ 250° C./216 kg (ml/10 min) | 14.9 | 13.7 | 13.1 | 11.1 | 8.7 | 14.3 | 29.2 |

TABLE 16-continued

| Example no. | R12 | 16 | 17 | 18 | 19 | 20 | 21 |
|---|---|---|---|---|---|---|---|
| Vicat-B (°C.) | 122 | 130 | 132 | 131 | 133 | 130 | 128 |
| Heat Sag (mm) | 27.5 | 14.5 | 12.5 | 11 | 9 | 11 | 15 |
| Ductile/ Brittle Temperature (°C.) | −26 | −13 | −15 | −16 | −26 | −3 | 10 |
| Young's Modulus (MPa) | 2004 | 2081 | 2081 | 2099 | 2082 | 2059 | 2126 |
| Yield Stress (MPa) | 53 | 54 | 54 | 54 | 53 | 51 | 55 |
| Elongation (%) | 130 | 110 | 61 | 133 | 108 | 125 | 11 |

The compositions in Table 16 demonstrate the beneficial results obtained with the addition of PEA (P4,4-5) to compositions having both a low molecular weight PBT and a high molecular weight PBT in a PBT/PC blend. Blending molecular weights of polyester is advantageous in obtaining an enhanced balance of properties, especially flow and ductility over using a single polyester molecular weight. As seen by these unexpected data, the Vicat-B and Young's modulii are substantially increased with the addition of an effective amount of PEA to the compositions.

Example 15

Properties are provided for PBT I/PBT II/P4,4-5 blends in a standard formulation containing 42.38 weight percent PBT+PEA, 45.84 weight percent PC, 11.0 weight percent MBS (methylmethacrylate-butadiene-styrene core-shell graft copolymer sold by Rohm and Haas under the tradename "Paraloid EXL-2600"), 0.3 weight percent additive "a", 0.3 weight percent additive "b", 0.1 weight percent additive "c", 0.008 weight percent additive "d". The composition referred to as "R13" is a reference composition.

TABLE 17

| Example no. | R13 | 22 | 23 | 24 | 25 | 26 | 27 |
|---|---|---|---|---|---|---|---|
| Wt % PBT I | 16.93 | 14.81 | 12.69 | 6.33 | 0 | 0 | 0 |
| Wt % PBT II | 25.47 | 25.47 | 25.47 | 25.47 | 40.28 | 38.16 | 31.80 |
| Wt % P4, 4–15 | 0 | 2.12 | 4.24 | 10.60 | 2.12 | 4.24 | 10.60 |
| Properties |  |  |  |  |  |  |  |
| MVR @ 250° C./216 kg (ml/10 min) | 14.0 | 14.6 | 15.1 | 14.3 | 28.6 | 26.4 | 18.8 |
| Vicat-B (°C.) | 121 | 129 | 128 | 129 | 128 | 129 | 129 |
| Heat Sag (mm) | 27 | 14 | 12 | 12 | 15 | 12 | 12 |
| Ductile/Brittle Temperature (°C.) | −30 | −13 | 0 | −8 | — | — | — |
| Young's Modulus (MPa) | 2302 | 2422 | 2460 | 2383 | 2445 | 2498 | 2532 |
| Yield Stress (MPa) | 53 | 55 | 55 | 55 | 55 | 55 | 55 |
| Elongation (%) | 110 | 77 | 49 | 30 | 7 | 11 | 18 |

The compositions in Table 17 demonstrate the beneficial results obtained with the addition of PEA (P4,4-15) to compositions having both a low molecular weight PBT and a high molecular weight PBT in a PBT/PC blend. As seen by these unexpected data, the Vicat-B and Young's modulii are substantially increased with the addition of an effective amount of PEA to the compositions.

What is claimed is:

1. A thermoplastic resin blend comprising:

A. a polyester resin;

B. a substantially aliphatic polyesteramide resin derived from units represented by the amide formula (I):

and the ester formula (II):

C. a polycarbonate resin.

2. The thermoplastic resin blend of claim 1, wherein the ratio of (I) to (II) is less than 1:1.

3. The thermoplastic resin blend of claim 2, wherein at least 80% of the units of formula (I) are separated by at least one of the units of formula (II).

4. The thermoplastic resin blend of claim 1, wherein said amide comprises the formula (VI):

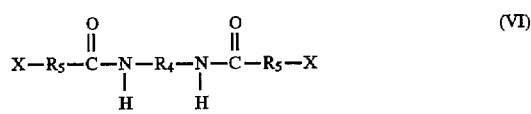

wherein X is, independently, a moiety selected from hydroxy, carboxylic acid, a lower alkyl or aryl ester of a carboxylic acid, epoxy, carboxylic acid ammonium salt or an anhydride; and $R_4$ and $R_5$ are, independently, alkyl or aryl groups, each having up to 12 carbon atoms; or wherein said amide comprises the formula (VII):

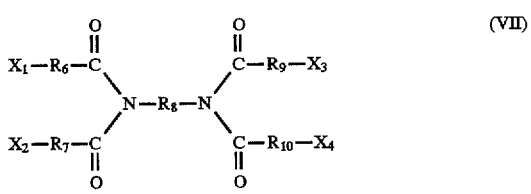

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from hydroxy, carboxylic acid, a lower alkyl or aryl ester of a carboxylic acid, epoxy, carboxylic acid ammonium salt or an anhydride, or hydrogen provided that at least one of $X_1$ or $X_2$ and $X_3$ or $X_4$ are not hydrogen.

5. The thermoplastic resin blend of claim 1, wherein said blend further comprises at least one additional additive selected from the group consisting of impact modifiers, reinforcing fillers, reinforcing fibers, processing aids, thermal stabilizers, oxidative stabilizers, electromagnetic modifiers, flame retardants, colorants, neutralizing agents, nucleating agents, and compatibilizers.

6. A thermoplastic resin blend consisting essentially of:
A. a polyester resin;
B. a substantially aliphatic polyesteramide resin derived from units represented by the amide formula (I):

  (I)

and the ester formula (II):

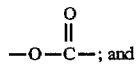  (II)

C. a polycarbonate resin.

7. The thermoplastic resin blend of claim 6, wherein said amide comprises the formula (VI):

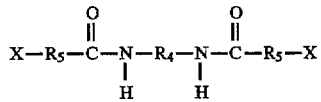  (VI)

wherein X is, independently, a moiety selected from hydroxy, carboxylic acid, a lower alkyl or aryl ester of a carboxylic acid, epoxy, carboxylic acid ammonium salt or an anhydride; and $R_4$ and $R_5$ are, independently, alkyl or aryl groups, each having up to 12 carbon atoms; or wherein said amide comprises the formula (VII):

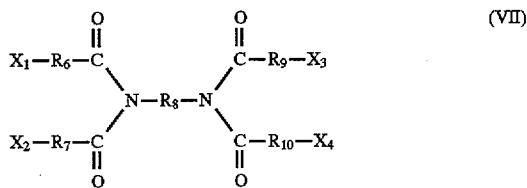  (VII)

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from hydroxy, carboxylic acid, a lower alkyl or aryl ester of a carboxylic acid, epoxy, carboxylic acid ammonium salt or an anhydride, or hydrogen provided that at least one of $X_1$ or $X_2$ and $X_3$ or $X_4$ are not hydrogen.

8. The thermoplastic resin blend of claim 1, wherein said blend further comprises at least one impact modifier.

9. The thermoplastic resin blend of claim 6, wherein said blend further consists essentially of at least one impact modifier.

* * * * *